INVENTORS
STANLEY H. PITKOWSKY
RICHARD B. GODFREY
BY Gunter A. Hauptman
ATTORNEY

PARITY CHECKING AND PARITY GENERATING MEANS FOR BINARY ADDERS

Filed June 25, 1963 3 Sheets-Sheet 3

HALF SUM CHECKER 16

SUM PARITY PREDICTOR 18

(GROUP AB)

3,342,983

PARITY CHECKING AND PARITY GENERATING MEANS FOR BINARY ADDERS

Stanley H. Pitkowsky, Poughkeepsie, and Richard B. Godfrey, Wappingers Falls, N.Y., assignors to International Business Machines Corporation, New York, N.Y., a corporation of New York Filed June 25, 1963, Ser. No. 290,486
16 Claims. (Cl. 235—153)

This invention is directed to electronic apparatus. More particularly, this invention is directed to circuits for checking the accuracy of arithmetic operations.

Arithmetic operations, such as addition, are performed upon operand words in order to yield result words. Parity indicators may be associated with each word for checking its accuracy. Electronic arithmetic apparatus commonly performs operations upon words represented by binary signals. Each binary integer or digit (which may be either a one or a zero), is here called a "bit." The operand words and the result word will, therefore, each include numeric information bits and parity bits.

Prior art shows the assignment of a parity bit to a specified group of bits within a binary word. For example, if a word comprises sixteen numeric bits, four additional bits may be set aside to provide one parity bit for every group of four numeric bits. The parity bits are given values which make the sum of 1-bits in each group, including the corresponding assigned parity bit, odd (or, if desired, even).

Prior art also shows arithmetic checking circuits which utilize parity bits to determine the accuracy of corresponding groups of bits. Such schemes, generally speaking, compare a predicted parity bit for a group with the actual parity bit associated with the group. If the two parity bits, predicted and actual, differ there is said to be a parity error. A parity error generally indicates that the group of bits being checked contains an error.

In some cases, however, a parity error indication does not occur, even though there has been an error, while in other cases an error indication occurs where in fact there has been no error. For example, an error indication will not occur if two compensating errors occur. As another example, a false error indication may result from a valid change in the bit configuration of a word which cause parity bits to become associated with non-corresponding bit groups.

It is therefore an object of this invention to provide arithmetic checking apparatus for indicating errors more accurately than has heretofore been possible.

Another object of this invention is to provide apparatus which generates an error indication even when normally compensatory errors have occurred in the quantity being checked.

An additional object of this invention is to provide apparatus for indicating the occurrence of actual errors only, as opposed to valid changes in the configuration of a quantity being checked.

Still another object is to provide apparatus wherein valid operations upon a quantity do not result in an error indication.

Another object is to provide arithmetic checking circuitry permitting operands to be shifted without affecting the accuracy of the checking operation.

A still further object of this invention is to provide apparatus for accurately performing the arithmetic operation of addition while checking the accuracy of the operands supplied, the results achieved, and intermediate steps thereto.

A further object of this invention is to provide a checking circuit which indicates what portion of the operands supplied to the circuit are inaccurate.

Still another object is to provide apparatus for generating signals used to check the accuracy of operands.

The foregoing and other objects, features and advantages of the invention will be apparent from the following more particular description of the preferred embodiment of the invention, as illustrated in the accompanying drawings.

These objects are achieved by the specific embodiment of the invention described herein in association with well-known "parallel carry look ahead" adder circuits. In such circuits, two binary operand words, called an addend and an augend, are added to give a binary result word, called a sum. Each operand, and the result, are divided into several groups of bits, every group having associated with it a parity bit. The adder operates upon the operand groups in parallel, generating a number of intermediate functions (generates, propagates, half sums, group carries and bit carries) before supplying the final result.

A half sum checker receives parity bits from the operands supplied to the adder; and also receives half sums generated by the adder as a function of the groups with which the parity bits are associated. Logic circuits in the half sum checker combine the parity bits and half sum information to provide an indication of the validity of each word and of each group. The half sum checker logic is so designed that in the event an error is detected in an operand word, the group in which the error occurred may, in normal cases, be identified. Normally every parity bit in the operand words is associated with its corresponding group of bits. If, however, the information bits of an operand word have been shifted, its parity bits may no longer be associated with their corresponding groups. The half sum checker logic circuitry is so arranged that the validity of the operand words is correctly indicated even though the information bits have been shifted prior to entry into the adder. Therefore, the validity of the operand words will be correctly indicated by the half sum checker even though the parity bits are not correctly associated with their corresponding information bit groups.

A sum parity predictor circuit predicts a parity bit for each bit group of the result, as a function of half sum, propagate and generate information available in the adder. The particular sum parity prediction circuit disclosed herein provides predicted parities with unusual rapidity at, or prior to, the time that the adder forms the sum. The predicted parities may then be compared with actual parities, generated as a function of the result, to indicate whether or not the result is valid.

The output of the half sum checker and the sum parity predictor indicates the accuracy of information supplied to the adder and the accuracy of operations performed in the adder. The possibility of compensating errors is thus greatly reduced.

In the figures:

FIGURE 1 is a block diagram showing the major portions of the invention and of an adder with which the invention may be used.

FIGURES 2*a*, 2*b*, and 2*c* are drawings illustrating the format of two operand words and a single result word.

FIGURES 3*a* and 3*b* are drawings illustrating the format of the two operand words of FIGURES 2*a* and 2*b* when information bits of the operand word of FIGURE 2*a* have been shifted left two bit positions.

*Brief description*

Figure 1:
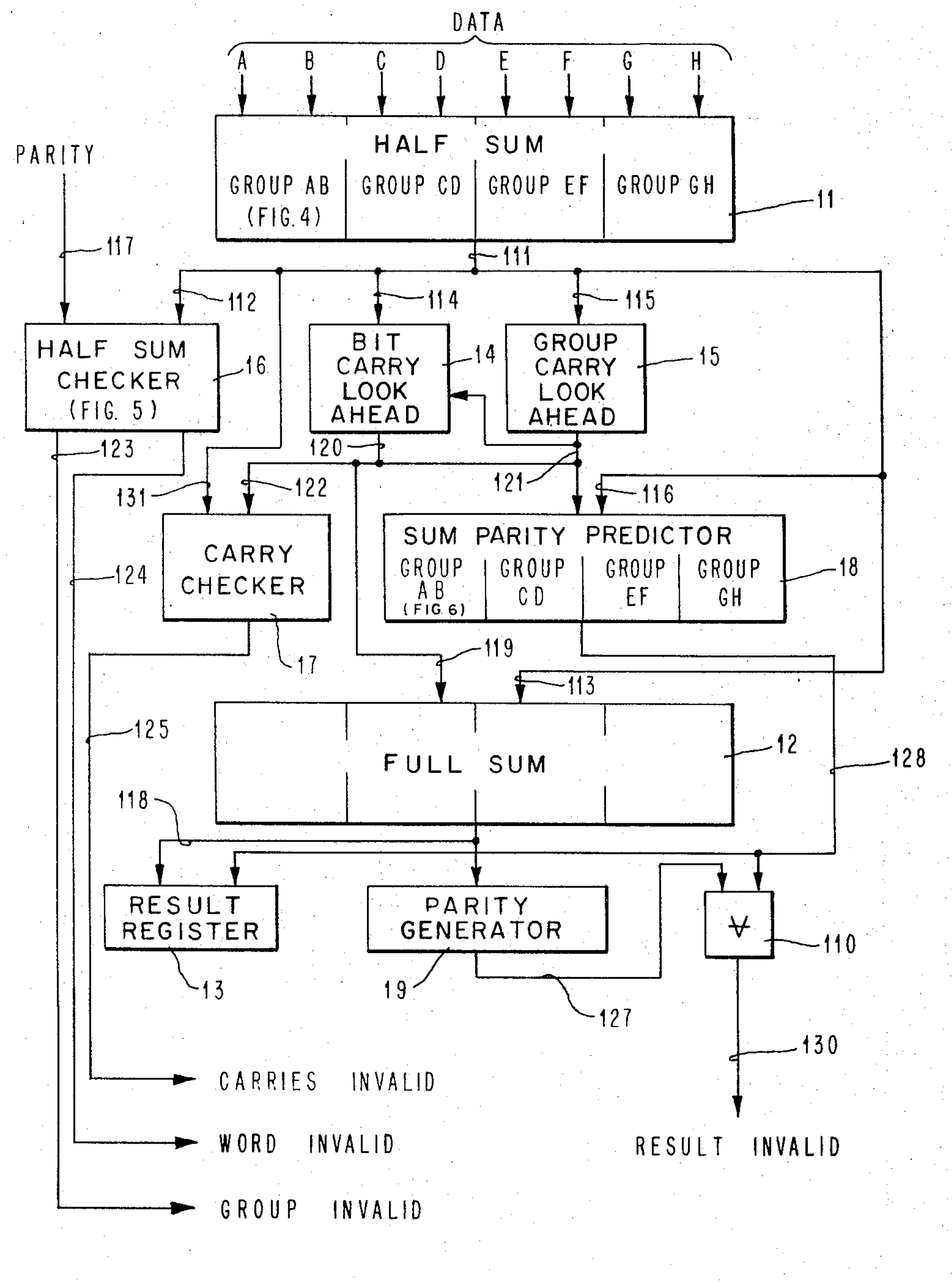

Referring to FIGURE 1 an arithmetic device with which the invention may be used will be briefly described. Binary, parallel, carry look ahead adders are themselves well-known the art; for example, see U.S. Patent No. 3,078,039, "Error Checking System for a Parallel Adder," of S. F. Anderson, assigned to the International Business Machines Corporation. Such adders usually include half sum circuits 11, bit carry look ahead circuits 14, group carry look ahead circuits 15, full sum circuits 12, a result register 13, and sometimes also include carry checker circuits 17, a parity generator 19, and an Exclusive OR comparison circuit 110, all shown as blocks in FIGURE 1. Novel features of circuits represented by the blocks labeled half sum checker 16 and sum parity predictor circuits 18 will be described in greater detail below.

Figure 2A:
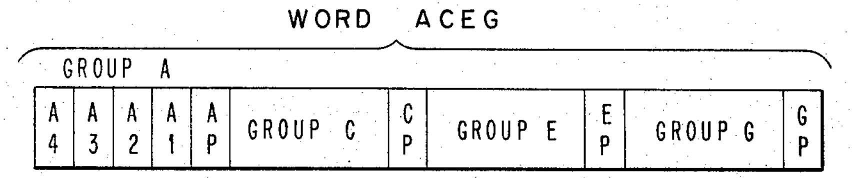
Figure 2B:
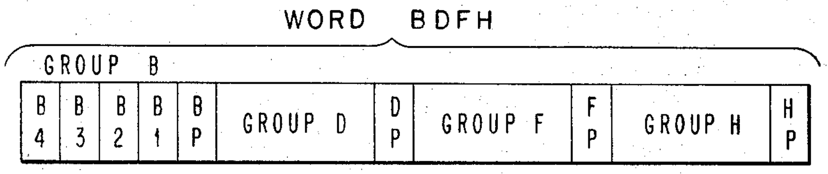
Figure 2C:
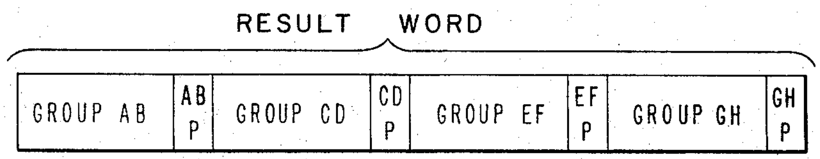
Figure 3A:
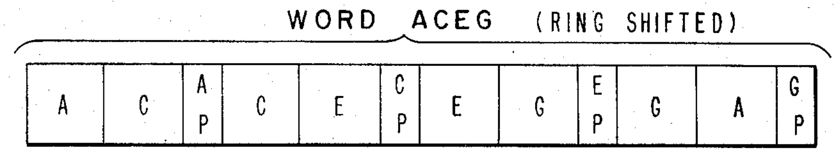
Figure 3B:
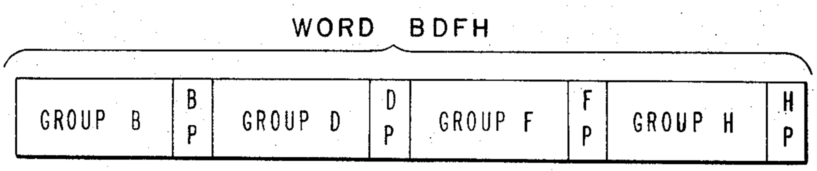

Referring to FIGURES 2*a*, 2*b* and 2*c*, the format of words used by the device of FIGURE 1 are shown. For purposes of illustration only, each word comprises twenty-five binary bits divided into groups of five bits each. One bit in each group of five bits indicates the parity of the other four bits in its group. Again for purposes of illustration only, the parity bit is adjusted to keep the sum of 1-bits in its corresponding group odd. It is of course possible to change the length of a typical word, as well as change the number of groups and therefore parity bits in each word, without changing the principle of the invention. In FIGURE 2*a*, operand word ACEG comprises four groups, A, C, E and G. Each group includes five bits: four information bits numbered 1 through 4 and one parity bit indicated by the letter P. For example, group C comprises the following five bits: C4, C3, C2, C1 and CP. FIGURE 2*b* shows a second operand word BDFH which is arranged in a manner similar to operand word ACEG. The result of adding operand words ACEG and BDFH (bit-for-bit, exclusive of the parity bits) is shown in FIGURE 2*c*. The result word is constructed similarly to the two operand words, each bit (except the parity bits) having a value which is the binary sum of the corresponding two operand words bits plus the carry, if any, from the previous (lower order, right hand) bit position. For example, group CD of the result word is a function of groups C and D of the operand words; it comprising bits: CD4, CD3, CD2, CD1 and CDP. The parity bit of a group, for example CDP, is designated CDP to show that it is a function of information contained in the words in which groups C and D are found. FIGURES 3*a* and 3*b* show two operands with their information bits shifted relative to each other. Operand word BDFH is identical to the word BDFH described previously with reference to FIGURE 2*b*. However, the information bits of word ACEG have been ring shifted (to the left, towards the higher orders) relative to word BDFH. Though the amount of shift is obviously arbitrary, the word ACEG is shown shifted two bit positions. The stationary parity bits are, as a result of the shift, now no longer associated with their corresponding information bits. For example, parity bit EP is associated with half of group E and half of group G; it still being set to a value which keeps the sum of 1-bits in corresponding group E odd.

Referring again to FIGURE 1, the operation of the invention in association with an adder will be summarized and then briefly described. Summarizing the operation, operand words, such as those shown in FIGURES 2*a* and 2*b*, will be simultaneously entered into the half sum circuits 11 at the group inputs labeled data. The result, such as that shown in FIGURE 2*c*, will be entered into the result register 13. During computation of a result by the adder, the half sum checker 16 will indicate by a signal on line 123 whether or not any group supplied to the adder contains an error. From this it follows that the half sum checker 16 will indicate on the line 124 that the word contains an error. The carry checker 17 will indicate by a signal on line 125 if the carries generated insider the adder of FIGURE 1 are incorrect. The sum parity predictor 18 will predict a parity bit for each group of the result word. When the result word is sent into the result register 13, the parity generator 19 will generate an "actual" parity for each group of the result word. A signal will appear on the line 130 if the predicted parity and the actual parity for any group are different, indicating that the result is incorrect. If the relatively shifted operands of FIGURES 3*a* and 3*b* are used, the operation of the circuits in FIGURE 1 will be the same, with one exception. In the case of shifted operands the signals on the line 123 from the half sum checker is ignored and only the word invalid indication on line 124 is used. The operation of the device of FIGURE 1 will now be briefly described in five arbitrarily chosen steps.

During a first step, operand words are entered into half sum circuits 11 in parallel as indicated by the letters identifying the group inputs. For example, group A of word ACEG and group B of word BDFH are both entered into group AB of the half sum circuits 11. During a second step, the half sum circuits 11 supply half sum, propagate and generate information on line 111 for use by other circuits. During a third step, the group carry look ahead circuits 15 receive information from the half sum circuits 11 on line 115 generating, as a result, predicted inter-group carries CG on line 121. During the third step, the bit carry look ahead circuits 14 utilize information from the half sum circuits 11 and the inter-group carries CG to generate inter-position bit carries CB on line 120. During the third step, the half sum checker 16 is also active, it checking the validity of the operand words and the operation of the half sum circuits 11. During a fourth step, the full sum circuits 12 utilize the information received on lines 119 and 113 to generate on line 118 result bits. During the fourth step, a parity bit is generated on line 128 for each group of the result word by the sum parity predictor 18 as a function of information received on lines 121 and 116. During the fourth step the carry checker 17 is also active, it checking the accuracy of the carries on line 122. During a fifth step the result is entered into the result register 13 on line 118 and the predicted parity bits are entered into the result register 13 by line 128. During the fifth step, the parity generator 19 derives from each result group a parity bit which is compared with the predicted parity for that group by Exclusive OR circuits 110.

During the third step, the half sum checker 16 inspects the parity bits of the operand words on line 117 and the half sum information on line 112. This inspection is, as will be explained in detail with reference to FIGURE 5 below, a "series" of Exclusive OR operations in which the order of operation is irrelevant (commutative law). The Exclusive OR operations should result in a final 0-bit—a 1-bit indicating an error. If the Exclusive OR of all the half sum and parity bits results in a 1-bit, a signal will be placed on the line 123 indicating that the group is invalid and also on line 124 indicating that (since a group is invalid) the word is invalid. In the event that operand parity bits are not associated with their corresponding information bits (by use of the operand words shown in FIGURES 3*a* and 3*b*), the commutative rule applied by the half sum checker 16 still gives a proper error signal on word invalid line 124.

During the fourth step the carry checker 17 and the sum parity predictor 18 are active. The carry checker 17 utilizes information available on line 131 to predict carries that should be present on line 122; it places a signal on line 125 if the carries present on line 122 are invalid. The sum parity predictor 18 operates in accordance with the rules explained in detail with reference to FIGURE 6 below, to supply on line 128 parities corresponding to the binary values of the groups in the result register 13.

Multiple self-compensating errors are detected by either the half sum checker 16 or the sum parity predictor 18. For example, an error in an input operand word may, due to a compensating error in the full sum circuits 12, go undetected in the sum parity checking circuits 18, 19 and 110; but, will still cause an invalid indication on line 124.

*Detailed description*

Figure 4:
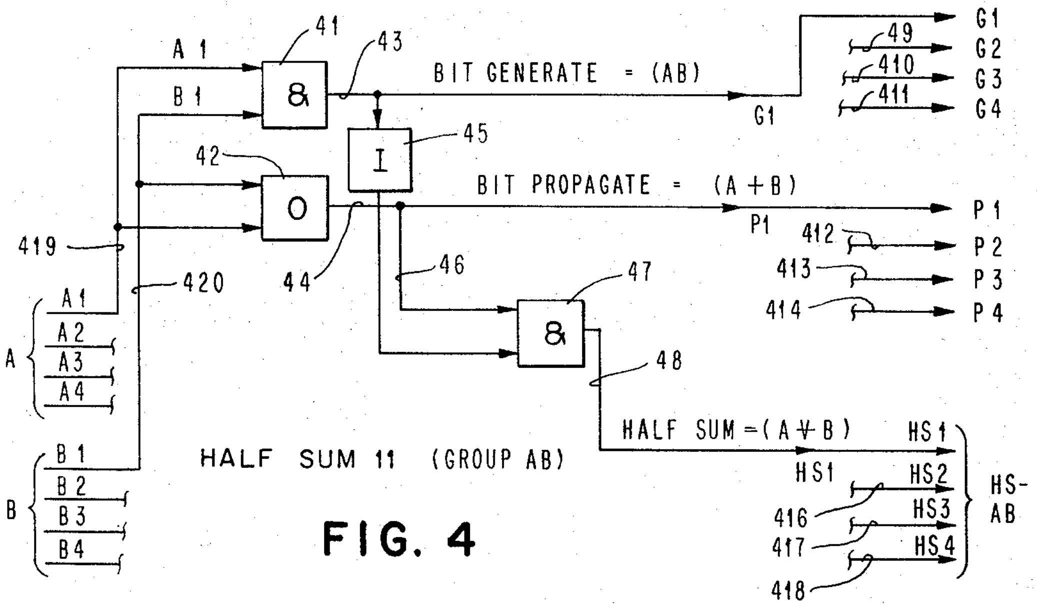
FIGURE 4 is a logic diagram showing the construction of a typical group of the half sum circuitry found in a well-known carry look ahead adder.

Half sum circuits 11 will be described with reference to FIGURE 4 which is a logic block diagram of a typical group AB. The circuitry is duplicated for each bit in each group of the half circuit 11. The object of a group half sum circuit is to supply half sum, bit propagate and bit generate information for each bit of the group. Circuits of this type are shown in the prior art, for example in the previously referenced U.S. Patent No. 3,078,039, as well as in publications such as: "A One-Microsecond Adder Using One-Megacycle Circuitry," by A. Weinberger and J. L. Smith published in the IRE Transactions on Electronic Computers, volume EC–5, June 1956, pages 65–73; and, in an article entitled, "High Speed Arithmetic in Binary Computers," by O. L. MacSorley, published in the Proceedings of the IRE, volume 49, January 1961, pages 67–91. In FIGURE 4, two corresponding bits A1 and B1 from two operand words ACEG and BDFH are supplied to the circuit on lines 419 and 420. An AND circuit 41 utilizes this information to supply on line 43 a bit generate signal G1 corresponding to the operand bits A1 and B1. An OR circuit 42 supplies on line 44 a bit propagate signal P1 corresponding to the same two operand bits. Similar circuits supply bit generate signals on lines 49, 410 and 411 and bit propagate signals on lines 412, 413 and 414 as a function of other operand bits of groups A and B. An AND circuit 47 receives signals from an inverter circuit 45 and from line 46 to place on line 48 a half sum value HS1 corresponding to operand bits A1 and B1. Since the half sum of two operand bits is defined as the Exclusive OR function of the two operand bits, the circuits 41, 42, 45 and 47 in effect function as an Exclusive OR circuit. Signals are also placed on lines 416, 417 and 418 to represent the half sums corresponding to the other operand bits of groups A and B.

Figure 5:
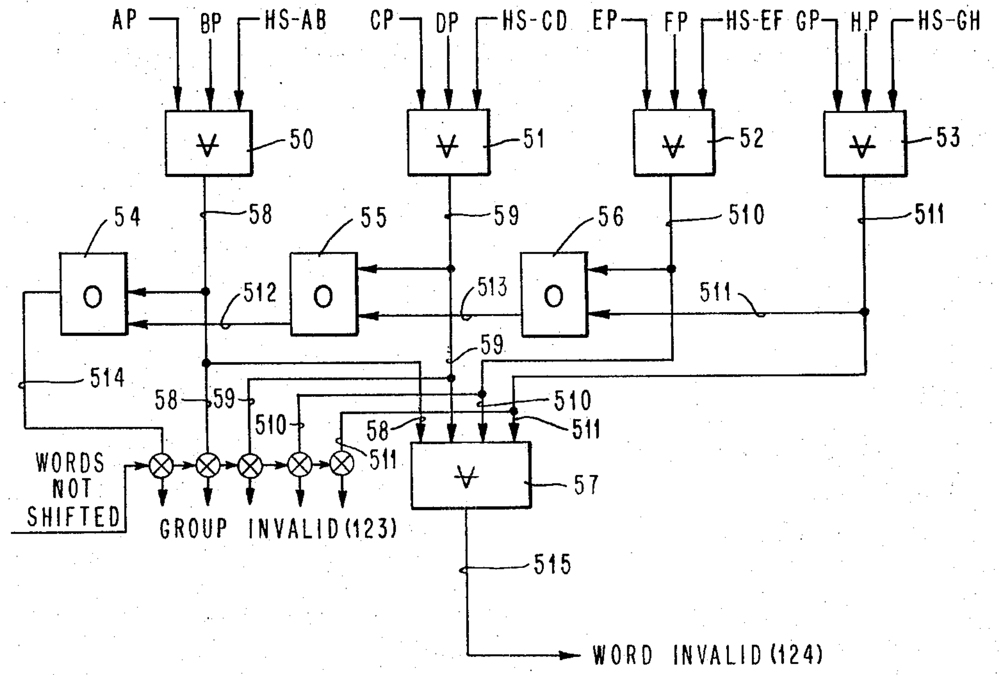
FIGURE 5 is a logic diagram illustrating the half sum checker.

The half sum checker 16 comprises circuits shown in detail in FIGURE 5. It is the purpose of the half sum checker 16 to indicate errors in information supplied to, and processed by, the half sum circuits 11. Supplied to the half sum checker 16 are all the operand parity bits and all the half sums from the half sum circuit 11. Exclusive OR circuits 50, 51, 52 and 53 each have six inputs. which are shown in FIGURE 5, for simplicity, as three lines. Operand parity bits AP and BP from groups A and B are entered into the two indicated inputs of Exclusive OR circuit 50, while the four half sum signals HS1, HS2, HS3 and HS4 for group AB are entered into four inputs indicated simply as line HS–AB in FIGURE 5. The other Exclusive OR circuits 51, 52 and 53 are similarly connected. Exclusive OR circuit 57 receives outputs 58, 59, 510 and 511 from the Exclusive OR circuits 50, 51, 52 and 53. The output 515 indicates, by a positive 1-bit signal, that one or more of the operand words has been either received, or operated upon, incorrectly. The use of Exclusive OR circuits in this manner may be represented by the equation:

$$(1)\quad \text{Word Invalid}=(AP\veebar BP\veebar HSAB1\veebar HSAB2\veebar HSAB3\veebar HSAB4 \ldots \veebar HSABn)\veebar - - - \veebar([m-1]P\veebar mP\veebar HS[m-1]m1\veebar HS[m-1]m2 \veebar HS[m-1]m3\veebar HS[m-1]m4\veebar \ldots \veebar HS[m-1]mn)$$

(Where *n* is the number of bits in a group and *m* is the total number of operand groups.)

It is desirable to be able to recognize the particular group in which the error indicated by a signal on line 515 occurred. For this purpose there are provided OR circuits 54, 55 and 56 which are connected in a chain by means of lines 513 and 512 to indicate on line 514 that an invalid group, or groups, is identified by signals on lines 58, 59, 510 and 511. The signals on these five lines, however, assume that all the operand word parity bits are correctly associated with their corresponding operand word groups, as shown in FIGURES 2*a* and 2*b*. If this assumption is not correct, due for example to a shifting of operands relative to each other, as shown in FIGURES 3*a* and 3*b*, then a normally present "words not shifted" signal is removed from gates in lines 514, 58, 59, 510 and 511, deactivating these lines. The word invalid signal on line 515 is correct in any case, because it relies on the above Equation 1.

Figure 6:
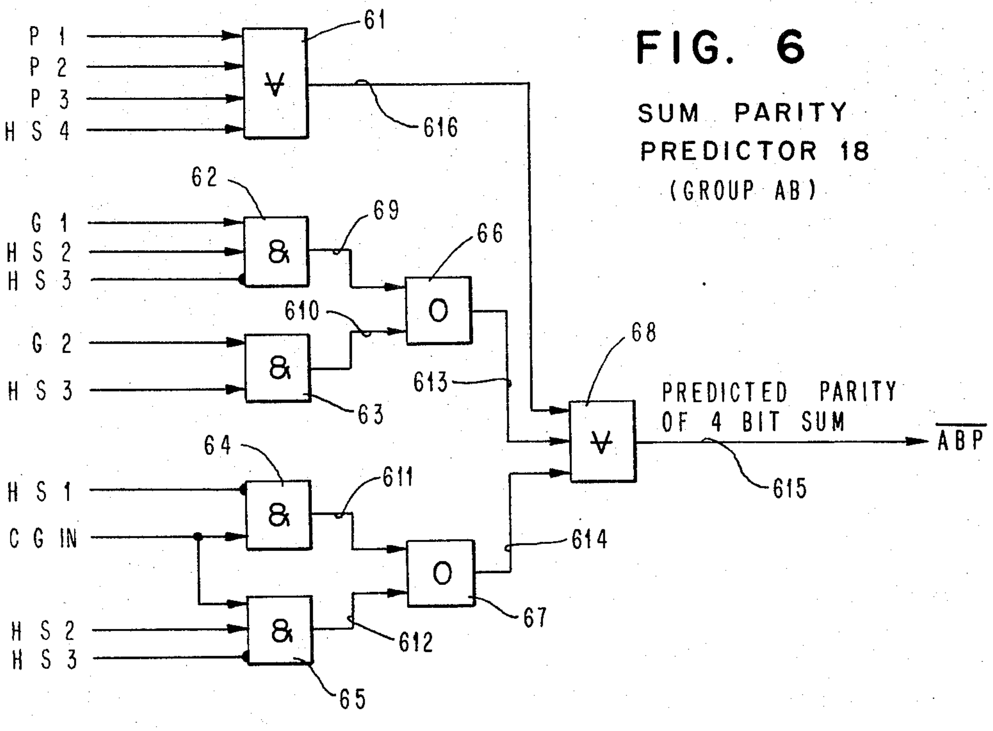
FIGURE 6 is a logic diagram illustrating a typical group within the sum parity predictor.

A sum parity predictor 18 is illustrated by a typical group AB, shown in FIGURE 6, the size of which group is of course arbitrary. The purpose of the sum parity predictor 18 group AB is to predict a parity bit ABP corresponding to the four bit sum AB formed by adding operand word groups A and B. The particular circuit shown in FIGURE 6 is intended to be an improvement over prior art devices such as that described in the copending U.S. application Ser. No. 261,351, filed Feb. 27, 1963, of Allan R. Geller entitled, "Parity Prediction Apparatus," assigned to the International Business Machines Corporation. The novel sum parity predictor 18 in groups A and B, shown in FIGURE 6, receives half sum, generate and propagate information from the half sum circuits of the type shown in FIGURE 4; and, receives group carry information from the group carry look ahead circuit 15 in the manner described in the referenced A. R. Geller application.

The invention embodied by the circuitry of FIGURE 6 may be generally described as:

$$(2)\quad \overline{ABP}=(P1\veebar P2\veebar P3\veebar \ldots \veebar P[n-1]\veebar HSn)\veebar CGin [\overline{HS1}+HS2(\overline{HS3}+HS4(\overline{HS5}+\ldots+HS[n-2](HS[n-1]) - - -)] \veebar[G1HS2(\overline{HS3}+HS3HS4(\overline{HS5}+HS5HS6(\overline{HS7}+\ldots+HS[n-3]\cdot HS[n-2](\overline{HS[n-1]}) - - -)\veebar G2HS3(\overline{HS4}+HS4HS5(\overline{HS6}+HS6HS7\cdot (\overline{HS8}+\ldots+HS[n-2]HS[n-1](\overline{HSn}) - - -)\veebar G3HS4(\overline{HS5}+HS5HS6\cdot (\overline{HS7}+HS7HS8(\overline{HS9}+\ldots+HS[n-3]HS[n-2](\overline{HS[n-1]}) - - -) \veebar - - - - - - \veebar G[n-2]HS[n-1]]$$

(Where *n* is the number of bits in the group.)

Exclusive OR circuit 61 and AND circuits 62, 63, 64 and 65 monitor inputs to group AB, producing on lines 68, 69, 610, 611 and 612 signals utilized by OR circuits 66 and 67 and Exclusive OR circuit 68 to supply on line 615 a predicted parity ABP. In the illustrated embodiment, which is representative of the particular case $n=4$, an OR circuit 66 is used rather than the Exclusive OR specified by Equation 2 as the $$G2(=A2\cdot B2) \text{ and } HS2(=A2\veebar B2)$$

terms are mutually exclusive. The semi-circular inputs to the AND circuits 62, 64 and 65 are inverted "inhibit" inputs. The predicted parity is, due to the simplicity of the circuit permitted by the above equation, provided at approximately the time that the adder supplies the corresponding sum group.

The operation of the invention will now be explained in detail with reference to two operand words; first as initially supplied, and then as shifted relative to each other. The words ACEG and BDFH as initially supplied, and the result obtained, are shown in Table I.

parity bits CDP=0, EFP=1 and GHP=1. In FIGURE 1, the full sum circuit 12 will supply to the result register 13 and to the parity generator 19 result groups having the values shown in Table I. The parity generator 19 will generate, from these result groups, parity bits which are sent via line 127 to the Exclusive OR circuits 110. Since the parity bits based on the groups shown in Table I are the same as those supplied by the parity predictor 18, there will be a 0-bit output on line 130 indicating that the result word in the result register 13 was correct. If there had been an error in the full sum circuit 12, then a 1-bit on line 130 would have indicated this error. (Note, that if there had been two errors, for example one error in the half sum circuit 11 and another error in the full sum circuit 12, the half sum checker 16 would indicate the occurrence of an invalid condition.)

TABLE I

| Word | 4 | 3 | 2 | 1 | P | 4 | 3 | 2 | 1 | P | 4 | 3 | 2 | 1 | P | 4 | 3 | 2 | 1 | P |
|---|---|---|---|---|---|---|---|---|---|---|---|---|---|---|---|---|---|---|---|---|
| ACEG | 1 | 1 | 0 | 0 | 1 | 1 | 1 | 1 | 1 | 1 | 0 | 1 | 0 | 0 | 0 | 1 | 0 | 0 | 1 | 1 |
| BDFH | 0 | 0 | 0 | 1 | 0 | 0 | 1 | 0 | 0 | 0 | 1 | 1 | 1 | 1 | 1 | 0 | 1 | 1 | 0 | 1 |
| Result | 1 | 1 | 1 | 0 | 0 | 0 | 1 | 0 | 0 | 0 | 0 | 0 | 1 | 1 | 1 | 1 | 1 | 1 | 1 | 1 |

Word ACEG shifted left one-half group (two information bits) relative to word BDFH, and the results obtained, are shown in Table II.

Referring now to Table II, the description of the circuit operation will be repeated for the case where the operand word ACEG is shifted left two information bit positions

TABLE II

| Word | 4 | 3 | 2 | 1 | P | 4 | 3 | 2 | 1 | P | 4 | 3 | 2 | 1 | P | 4 | 3 | 2 | 1 | P |
|---|---|---|---|---|---|---|---|---|---|---|---|---|---|---|---|---|---|---|---|---|
| ACEG | 0 | 0 | 1 | 1 | 1 | 1 | 1 | 0 | 1 | 1 | 0 | 0 | 1 | 0 | 0 | 0 | 1 | 1 | 1 | 1 |
| BDFH | 0 | 0 | 0 | 1 | 0 | 0 | 1 | 0 | 0 | 0 | 1 | 1 | 1 | 1 | 1 | 0 | 1 | 1 | 0 | 1 |
| Result | 0 | 1 | 0 | 1 | 1 | 0 | 0 | 1 | 0 | 0 | 0 | 0 | 0 | 1 | 0 | 1 | 1 | 0 | 1 | 0 |

The columns in Tables I and II are identified by the number of each bit within its group of the word, while the lines identify the word. In Table I for example, the bits of word ACEG, group A (in the order A4, A3, A2, A1, AP) are: 11001. The same five bit positions ring shifted (except for the parity bit) are shown in Table II to be 00111. For simplicity, the illustration will, where possible, be confined to groups A and B. It is assumed that there is no external input carry into the first (right-hand) position of the adder.

In the first case, shown in Table I, words ACEG and BDFH are entered into the half sum circuits 11. Referring to FIGURE 4, group A (reading from position A4 through A1) inputs 1100 and group B (B4 through B1) inputs 0001 cause corresponding half sum (HS4 through HS1) outputs 1101, propagate (P4 through P1) outputs 1101 and generate (G4 through GE) outputs 0000. Referring to FIGURE 5, the half sum checker combines all the operand parity bits and all the half sum signals in Exclusive OR circuits 50, 51, 52, 53 and 57. For example, Exclusive OR circuit 50 combines values 101101 (representing the bits AP, BP and HS4 through HS1) in separate paired Exclusive OR operations. A 0-bit emerges on line 58 indicating that neither group A nor group B are invalid. (If any 1-bit, for example a parity bit, had been inverted, a 1-bit would have emerged on line 58 to indicate that this particular group was invalid.) 0-bits emerge on all of lines 58, 59, 510 and 511 resulting in 0-bits on lines 514 and 515, which indicate that all groups are valid, and that thus the words were, and half sums are, valid. Referring to FIGURE 6 (reading from top to bottom), the following signals are supplied: 1011001011101. Note that the group carry CG into group AB is a 1-bit for the example shown in Table I. The Exclusive OR circuit 68 will therefore place a 1-bit on line 615, which bit represents the inverse predicted parity $\overline{ABP}$ for result word group AB. Similarly, circuits for groups CD, EF and GH will supply predicted as shown. Operand words ACEG and BDFH are entered into the half sum circuits 11, referring to FIGURE 4, as (reading from input positions 4 through 1) 0011 and 0001, respectively. The resultant outputs are (again reading from positions 4 through 1), as follows: half sums 0010, propagates 0011 and generates 0001. Referring to FIGURE 5, outputs 59 and 511 of the Exclusive OR circuits 51 and 53 will indicate 1-bits, because the operand word parity bits are not associated with their corresponding bit groups. However, as seen from FIGURE 5, the output 515 of Exclusive OR circuit 57 is a 0-bit, indicating that the words supplied, and the half sums obtained, are valid. As mentioned previously, when shifted operands are supplied, the "group invalid" lines are ignored by removing the signal normally on the "words not shifted" line. Referring now to FIGURE 6, the sum parity predictor 18 receives the following signals (reading from top to bottom): 1100110000110. Note that a group carry CG into group AB exists for the values of Table II. A 0-bit is placed on line 615 as the value of inverse parity bit $\overline{ABP}$. The result register 13 is, as previously described, filled with result information from full sum circuits 12 and from the sum parity predictor 18 as shown in Table II. Parity bits generated by the parity generator 19 are compared with values from the sum parity predictor 18 values on line 128 via the Exclusive OR circuits 110 giving a 0-bit on result invalid line 130 for a parity error indication.

There has been described apparatus for checking adders to a degree of accuracy not previously attainable. The checking circuits are operative even though the operands are shifted relative to each other and relative to the parity bits supplied with the operands. The circuits also permit the detection of multiple errors which are not normally detected by prior art error checking circuitry. The particular circuits utilized to achieve these results are designed in an exceptionally efficient manner permitting unexpectedly rapid operation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination:

input means for supplying a plurality of operands, each operand comprising a plurality of binary signals;

partial arithmetic means, connected to said input means, for performing partial arithmetic operations upon said operands and generating partial arithmetic signals;

partial arithmetic checking means, connected to said partial arithmetic means and to said input means, for generating error signals indicating the invalidity of said supplied operands and of said partial arithmetic operations performed upon said operands, as a function of said partial arithmetic signals and selected ones of said binary signals;

carry generation means, connected to said partial arithmetic means, for generating signals representative of arithmetic carries, as a function of said partial arithmetic signals;

final arithmetic means, connected to said carry generation means and to said partial arithmetic means, for forming a binary sum from specified binary signals of said supplied operands as a function of said partial arithmetic signals and said arithmetic carry signals;

parity prediction means, connected to some only, less than all, of the outputs of said carry generation means and to some only, less than all, of the outputs of said partial arithmetic means, for generating indications representative of the predicted parity of the binary sum formed by said final arithmetic means, as a function only of said partial arithmetic signals and said arithmetic carry signals delivered to said connected outputs; and, utilization means, connected to said final arithmetic means and to said parity prediction means, for utilizing said binary sum and said predicted parity indications.

2. The combination of claim 1 wherein said partial arithmetic checking means comprises:

logic circuits, for supplying first and second signals representative of the Exclusive OR function of said partial arithmetic signals and of said selected binary signals;

first error indicating means, connected to said logic circuits, for conveying first error signals indicating the invalidity of said supplied operands and of said partial arithmetic operations, as a function of said first signals; and, second error indicating means, connected to said logic circuits, for conveying second error signals localizing the invalidity in portions of said supplied operands and said partial arithmetic operations performed thereon, as a function of said second signals.

3. The combination of claim 1, wherein said parity prediction means comprises:

a first set of circuits operable to generate a first number of signals as a function of selected ones of said partial arithmetic signals only;

a second set of circuits operable to generate a second number of signals as a function of selected ones of said partial arithmetic signals and said arithmetic carry signals; and, a third set of circuits, connected only to said first and second sets, for producing predicted parity indications as a function of said first and second numbers of signals.

4. In association with arithmetic apparatus for adding a number of plural-order parity-checked operands, the relative positions of corresponding non-parity orders of operands supplied to the adder being variable; adder checking circuits comprising:

first logic circuit means, for generating first signals as an Exclusive OR function of operand parity orders and information derived from the operand non-parity orders by the adder;

second logic circuit means, for generating second signals as an Exclusive OR function of said first signals; and first error indication means connected to said second logic circuits, operable by said second signals to indicate errors utilized without regard to the relative positioning of corresponding operand orders.

5. The adder checking circuits of claim 4 further comprising:

second error indicating means, connected to said first logic circuits, operable by said first signals to indicate errors utilized only when corresponding orders of said supplied operands are in one selected relative position.

6. Adder checking means, for detecting errors during the addition of operands comprising plural groups of information bits and corresponding parity bits which parity bits are in a first case associated with their corresponding information bit groups, and in a second case are not, comprising:

half sum circuits for receiving information bits, and forming, as a function thereof, half sum signals;

logic circuits connected to said half sum circuits, for receiving said parity bits and said half sum signals and for supplying output signals as an Exclusive OR function thereof; and error means, connected to said logic circuits, for indicating, in said first and said second cases, the invalidity of said operands and said half sum signals.

7. The adder checking means of claim 6 further comprising:

additional circuits, connected to said logic circuits, utilized, in said first case, to localize within a group the invalidity indicated by said error means.

8. Checking apparatus, for use with half sum circuits in parallel-carry look-ahead adders supplied by operand words comprising groups of information bits with which are associated parity bits, which parity bits correspond to groups of said information bits; comprising:

a number of logic circuits, each operable to supply a signal as an Exclusive OR function of the operand parity bits and half sums of a different group of information bits;

first additional circuits, connected to aforesaid logic circuits, to supply a word error signal as an Exclusive OR function of said signals; and, second additional circuits, connected to said logic circuits, utilized only when parity bits are associated with the group of information bits with which they correspond, to supply group error signals for identifying the groups in which errors occur.

9. Check circuits, for detecting normally compensating errors in a binary adder, comprising:

a first checker, connected to an input portion of said adder, for indicating errors in the input portion of said adder; a second checker independent of said adder, connected to an input portion of said adder, for indicating errors entering the output portion of said adder; and means connected to the said first and second checkers for indicating the operation of said checkers.

10. Apparatus for predicting a parity bit for use with the sum of two operands, including:

a source of operand signals;

half sum circuits, connected to said source, operable to form half sum signals as a function of selected ones of said operand signals;

generate-propagate circuits, connected to said source, operable to form generate and propagate signals for respectively controlling the generation and bypass routing of arithmetic carry signals in each arithmetic digit order as a function of specified ones of said operand signals;

first logic, connected to said source and to said half sum and generate propagate circuits, for forming first signals as a function only of said half sum, propagate, generate signals and predetermined ones of said selected operand signals; and second logic, connected to said first logic, for predicting a parity bit for use with the sum derived from aforesaid selected operand signals, as a function of said first signals.

11. A circuit for predicting a parity bit ABP, for use with a four-bit binary sum of numbers A (=$A4A3A2A1$) and B (=$B4B3B2B1$), derived from half sum information HS1, HS2, HS3, HS4; generate information G1, G2 ($Gi=Ai \cdot Bi$) for controlling generation of carry signals; propagate information P1, P2, P3 ($Pi=Ai+Bi$) for controlling propagation of carry signals from preceding to succeeding bit orders; and an input carry CG; comprising:

first logic circuits for generating first signals X and second signals Y defined as follows:

$$X=P1 \veebar P2 \veebar P3 \veebar HS4$$
$$Y=(G1 \cdot HS2 \cdot \overline{HS3})+(G2 \cdot HS3)$$

second logic circuits for generating a third signal Z defined as follows:

$$Z=(\overline{HS1} \cdot CG)+(CG \cdot HS2 \cdot \overline{HS3})$$

and third logic circuits, connected to said first and second logic circuits for generating the inverse predicted parity $\overline{ABP}$ as a function of said signals X, Y and Z, said function being defined as follows:

$$\overline{ABP}=X \veebar Y \veebar Z.$$

12. In combination:

input means for supplying binary operand signals representing arguments of an arithmetic operation and parity bit signals useful for checking the validity of said arguments;

first logic circuit means responsive to said argument signals for generating partial result signals;

first checking means coupled to said input means and said first logic circuit means for producing an intermediate parity check indication as a function of said parity bit signals and said partial result signals;

second logic circuit means coupled to said first logic circuit means for producing final result signals representative of a final result function of said arguments;

parity predict circuit means coupled to said first logic circuit means for generating signals representative of the predicted parity of said final result signals independent of both the parity bit signals provided by said input means and the signals handled by said second logic circuit means, and hence substantially independent of errors occurring within the system defined by said second logic circuit means;

second checking means coupled to said second logic circuit means and said parity predict circuit means for checking the validity of said final result signals; and result register means coupled to said second logic circuit means and said parity predict circuit means for simultaneously receiving and storing representations of said final result and predicted parity signals respectively, independent of the outcome of the operations performed by said first and second checking means; whereby the result parity registered by said register means agrees with the result intelligence simultaneously registered in all instances except when an actual arithmetic error has occurred, as signalled by said second checking means.

13. The combination of claim 12 wherein:

said first and second logic circuit means as connected present a first circuit delay of a first predetermined duration between said input operand signals and final result signals, and said first logic circuit means and parity predict circuit means as connected present a second circuit delay having a duration less than or equal to said first duration.

14. The combination of claim 12 wherein:

said first and second logic circuit means as connected present a first circuit delay of predetermined first duration between said input operand signals and final result signals, and said first intermediate result checking means is adapted to present together with said first logic circuit means a second predetermined circuit delay having a duration less than or equal to said first duration.

15. The combination of claim 13 wherein:

said parity predict circuit means is adapted to function in response only to some less than all of the outputs of said first logic circuit means in order to effectively limit the duration of said second predetermined delay as specified in claim 14 and to render the predicted parity signals produced therein substantially independent of said second logic circuit means and therefore capable of being used as a true check of the validity of operation of said second logic circuit means.

16. The combination of claim 12 wherein:

said parity signals supplied by said input means relate to different respective portions of the associated argument signals;

said input arguments are received at said first logic circuit means in either a shifted or unshifted position in relation to the related parity signals; and said first checking means is adapted to provide a useful check indication independently of relative shifts in position of said argument and parity signals.

References Cited

UNITED STATES PATENTS

| | | | |
|---|---|---|---|
| 3,078,039 | 2/1963 | Anderson | 235—153 |
| 3,141,962 | 7/1964 | Sakalay | 235—153 |
| 3,145,293 | 8/1964 | Homan | 235—92 |
| 3,196,259 | 7/1965 | Erickson | 253—153 |
| 3,196,260 | 7/1965 | Pugmire | 235—173 |

MALCOLM A. MORRISON, *Primary Examiner.*

MARTIN P. HARTMAN, *Examiner.*